United States Patent [19]

Rosenbach et al.

[11] Patent Number: 5,481,504
[45] Date of Patent: Jan. 2, 1996

[54] METHOD AND DEVICE FOR DETERMINING TARGET SPEED AND DISTANCE WITH FREQUENCY MODULATED PULSES

[75] Inventors: Karlhans Rosenbach, Bonn; Jochen Ziegenbein, Rheinbach, both of Germany

[73] Assignee: Atlas Elektronik GmbH, Bremen, Germany

[21] Appl. No.: 240,069

[22] Filed: May 9, 1994

[30] Foreign Application Priority Data

May 21, 1993 [DE]  Germany ............... 43 17 038.2

[51] Int. Cl.[6] ...................................... G01S 15/10
[52] U.S. Cl. ............... 367/101; 367/89; 367/99; 342/109; 342/128
[58] Field of Search ................ 367/89, 90, 99, 367/101, 102, 100; 342/109, 110, 112, 201, 128, 131, 132

[56] References Cited

U.S. PATENT DOCUMENTS

| 3,427,617 | 2/1969 | Richman | 342/201 |
| 4,053,889 | 10/1977 | Johnson | 342/201 |
| 4,470,048 | 9/1984 | Short, III | 342/189 |
| 4,998,224 | 3/1991 | Hundt | 367/100 |
| 5,077,702 | 12/1991 | Whyland | 367/100 |
| 5,212,489 | 5/1993 | Nelson | 342/109 |
| 5,212,490 | 5/1993 | Nelson et al. | 367/100 |
| 5,289,192 | 2/1994 | Rohling et al. | 342/109 |

FOREIGN PATENT DOCUMENTS 0282265 9/1988 European Pat. Off. .
0504702 9/1992 European Pat. Off. .
2184236 6/1987 United Kingdom .

OTHER PUBLICATIONS

Patents Abstracts of Japan, vol. 14, No. 92 (P-1009) 20 Feb. 1990 & JP-A-01 299 485, (NEC Corp.) Dec. 4, 1989.
Patents Abstracts of Japan, vol. 17, No. 461 (P-1598) Aug. 23, 1993 & JP-A-05 107 349 (Mitsubishi El. Corp.) Apr. 27, 1993.
August W. Rihaczek, "Principles of High-Resolution Radar", 1969, pp. 184–185.
Merrill I. Skolnik, "Radar Handbook", 1970, pp. 3–8–3–10, 3–16–3–20.
I. N. Bronstein and K. A. Semendjajew, "Taschenbuch Der Mathematik", 1970, pp. 72–73.

Primary Examiner—Ian J. Lobo
Attorney, Agent, or Firm—Spencer, Frank & Schneider

[57] ABSTRACT

Frequency-modulated wave trains are used in target locating by means of transmitted pulses and evaluation of portions reflected by the target in relation to bearing, distance and speed, wherein the pulse length and bandwidth of the transmitted pulse are pre-selected. The received signals are evaluated in Doppler channels by calculation of the ambiguity function. To make possible an increase in accuracy of the speed determination with the same number of Doppler channels, the frequency of the wave train within the bandwidth is calculated in accordance with an irrational function, the exponent of which has a value between 0 and 1. The smaller the value, while keeping the same pulse length, the greater the Doppler sensitivity. This method for modulating the wave train in the transmitted pulse can be advantageously employed for target identification by means of sound waves and electromagnetic waves.

16 Claims, 7 Drawing Sheets

METHOD AND DEVICE FOR DETERMINING TARGET SPEED AND DISTANCE WITH FREQUENCY MODULATED PULSES

CROSS REFERENCE TO RELATED APPLICATIONS

The present application claims the right of foreign priority with respect to German application P 43 17 038.2, filed in Germany on May 21, 1993, the disclosure of which is incorporated herein by reference.

FIELD OF THE INVENTION

The invention relates to a method for identifying targets and/or determining their target data in respect to speed and/or distance, wherein signal transmissions with frequency-modulated waves are transmitted and received within pre-determinable pulse lengths and the received signals are evaluated by forming the ambiguity function.

BACKGROUND OF THE INVENTION

Stationary and moving targets are detected and located by radar and sonar installations in that a pulse is transmitted and portions thereof reflected by the target are selectively received in accordance with their direction. The running time of the received signals between transmission and reception and the frequency shift between transmitting and receiving frequencies is evaluated, based on the Doppler effect, in order to determine the distance and movement of the target or its speed in the direction toward or away from the receiver site.

Because the Doppler shift is involved in the determination of the distance as well as the speed, the form of the transmitted signal is selected as a function of the intended use. Transmitted pulses with continuous waves of a single frequency, so-called CW pulses, are used if speed measurement is of paramount importance. Its accuracy is a function of the pulse length and increases with increasing pulse length. Transmitted pulses with linear frequency-modulated waves, so-called LFM pulses, are less sensitive to the Doppler effect and are better suited for distance measuring, and their accuracy increases with increasing bandwidth.

Reference signals, which are derived from the transmitted pulses by means of frequency and time shift, are used for determining distance and speed. The number of reference signals which are stored for comparison with the received signal is a function of the distance and speed resolution. If the received signal and the reference signal agree exactly, the time shift and the frequency shift of the reference signal performed in accordance with the Doppler effect indicates the distance and speed of the target in the direction towards the receiver site. The distance and speed is determined by correlating the received signal with all reference signals. The result of the correlation shows a maximum when the received and the reference signals are identical. Deviations result in a reduction of this value. The dependency of the time and frequency deviation between the received signal and the reference signal, i.e. the distance and speed errors, for the result of the correlation can be represented as a so-called ambiguity function on a time-frequency plane or distance-speed plane. The ambiguity has its maximum with "zero" error, i.e. at the origin of the time-frequency plane and, as a function of the selected signal form of the transmitted pulse, becomes smaller with frequency and time deviations.

The ambiguity function of a CW pulse of great pulse length has the shape of the back of a knife along the distance axis, i.e. the CW pulse always provides the maximum value of the ambiguity function when the frequency of the reference signal is the same as the Doppler-shifted frequency of the received signal or shows small deviations. However, time shift errors do not result in a steep decline of the value of the ambiguity function. Thus, the CW pulse provides good speed resolution (see, for example, M. I. Skolnik, "Radar Handbook", McGraw-Hill Book Company, 1970, 3–17 and 3–20), which is greater with increasing pulse length.

Longer pulse lengths are required to attain larger ranges. As a result, transmitted pulses in the form of CW pulses are not suited for distance measuring. Transmitted pulses with linear frequency-modulated waves, so-called LFM pulses, are better suited for this task. Their ambiguity function also has the shape of the back of a knife which, however, in comparison with the ambiguity function of the CW pulse, is rotated in the time-frequency plane towards the frequency axis and contains an angle in relation to the time axis, so that distance measuring with only small errors is possible even with reference signals which have an increased frequency deviation in comparison to the received signal.

In the book "Principles of High-Resolution Radar", McGraw-Hill Book Company, 1969, page 184, A. W. Ribaczek discloses that the width and rotation of the back of the knife of the ambiguity function can be affected in that within the pulse length the transmitted frequency increases by the square or cube, instead of linearly over time. The greater the exponent, the more the back of the ambiguity function is flattened and turned toward the frequency axis, so that permissible frequency deviations between the received signal and the reference signal can be further increased without the distance measurement containing increased errors. However, further increase of the exponent beyond a squared or cubed course of the transmitted frequencies does not result in any further advantage. The sensitivity of time measurement which can be attained with such a transmitted pulse is considerably less than with a linear frequency-modulated pulse, but the sensitivity of the distance measurement is greater.

To attain the same resolution in the determination of distance as well as speed, pulse trains are used, for example, which have middle frequencies and frequency or phase modulations which change from pulse to pulse and are selected by means of a random code. The center maximum of their ambiguity function is compared to a thumb tack in the origin of the time-frequency plane and is called thumb tack ambiguity function.

The outlay for evaluating such pulse trains by means of reference signals is considerably greater than with a transmitted CW pulse or frequency-modulated pulse because, as a function of the required great bandwidth and pulse length for the reference signals, the time and frequency grid must be selected to be very fine in order to obtain a correlation result at all by comparison of the patterns, i.e. to obtain the maximum of the ambiguity function.

The comparison of the received signal with Doppler-frequency-shifted reference signals is performed in so-called Doppler channels. The higher the demanded resolution of the determination of the speed and distance, the greater must be the selected bandwidth and pulse length of the transmitted pulse and the number of Doppler channels and thus the number of reference signals to be made available for the correlation.

OBJECT AND SUMMARY OF THE INVENTION

It is an object of the present invention to provide a method of the type mentioned above which allows an increase in the speed resolution without an increase in the pulse length with the same outlay as with transmitted pulses of frequency-modulated waves.

The above and other objects are accomplished according to the invention by the provision of a method for determining target speed and distance, comprising: transmitting and receiving signal transmissions with frequency-modulated waves within pre-determinable pulse lengths, wherein the transmitted frequency (f) is selected to be rising or falling over a time (t) during at least one pulse length (T) within a pre-selectable bandwidth (B) in accordance with a pre-selectable irrational function having an exponent (e) that has a constant value during the pulse length (T) and is selected to be larger than 0 and smaller than 1; and forming an ambiguity function from the received signals and evaluating the ambiguity function for determining speed and distance.

The transmitting frequency is changed during the pulse length in proportion to a power of time, the exponent of which is less than "1", for example it is increased in accordance with the course of the root function. Then the exponent of the irrational function, which indicates the course of the transmitted frequency over time, has the value $\alpha=\frac{1}{2}$. Compared with the ambiguity function of an LFM pulse of equal pulse length and bandwidth, the associated ambiguity function has a back in the time-frequency plane which includes a slight angle in respect to the time axis and is considerably more narrow and also shorter in its longitudinal direction. The ambiguity function has the shape of a mountain peak. A section through the ambiguity function in the time-frequency plane perpendicular to the time axis results in a course of the maxima of the ambiguity function over the frequency in the frequency range of the Doppler shift which has a very pronounced absolute maximum in the Doppler channel corresponding to the speed of the target. In comparison thereto, the course of the maxima of the ambiguity functions which are a part of an LFM pulse is considerably flatter. With the same pulse length, this transmitted pulse makes possible, in addition to good distance measuring, a more accurate speed measurement than with the LFM pulse, because the transmitted frequency is not linear, but increases rapidly at the start of the transmitted pulse and then more slowly over time.

The smaller the value $\alpha$ ($0<\alpha<1$) is selected to be, the more the back of the ambiguity function in the time-frequency plane representing the display plane is turned toward the time or distance axis, relative to the shape of the LFM pulse. In this case the transmitted frequency increases more rapidly over time to its maximum value, so that the transmitted pulse more and more differs from the shape of the LFM pulse and, with very small values of $\alpha$, has the shape of a CW pulse at the end of its pulse length. This has the result that the back of the ambiguity function turns further in the direction toward the time axis and the Doppler sensitivity is increased further. The simultaneous small reduction in the accuracy of distance measuring in the Doppler channel having the absolute maximum of the ambiguity function because of a decreasing value of e can be tolerated, because the effectively acting bandwidth which determines the distance resolution decreases only slightly.

The particular advantage of the method of the invention when used in underwater sound technology is that with only a single transmitted pulse, the bandwidth of which is preset by the size of the transmitting-receiving installation and the pulse length of which is preset by the desired range, the accuracy of the distance and speed measurement is set by the value $\alpha$ of the modulation of the wave train in the transmitted pulse alone, without an increase of outlay for Doppler channels. In this connection it is particularly advantageous that it is possible by means of the bandwidth to make the echo as small as possible and the distance resolution as large as possible. It is of particular advantage that the strict coupling of the grids of the Doppler channels with the pulse length and thus an increase in the number of Doppler channels when increasing the pulse length is no longer necessary. For longer transmitted pulses the value of $\alpha$ is also increased and the Doppler sensitivity is retained with the same number of Doppler channels. It is furthermore advantageous that it is possible to detect targets and to determine their target data in the shortest possible time, namely after only one transmitted pulse. The disclosure of the transmitter's own position is as small as possible, because outside sonar installations also receive only one transmitted pulse for detection and classification.

It is furthermore particularly advantageous that only a single received signal suffices for measuring distance and speed, because a measurement is assured even if, because of inferior signal propagation conditions, only one received signal out of a series of transmitted signals is available.

The advantage of the method of the invention furthermore lies in that the Doppler range and a suitable Doppler sensitivity of the transmitting-receiving installation can be set by the selection of the value of the exponent $\alpha$ between the value 0 and 1 and without changing the number of the Doppler channels. The Doppler sensitivity is very great for very small values of $\alpha$. The course of the maxima of the ambiguity function shows a very pronounced absolute maximum so that the Doppler channel which indicates the speed of the target with the smallest error is clearly discernible. This property is of particular advantage, if defined speed values are particularly characteristic for a classification of the target. Even with a small number of Doppler channels it is possible to assuredly separate stationary targets, for example, from moving targets, even if they have the same bearing, because the Doppler channel, the reference signal of which is equal to the transmitted signal, is clearly distinguished from the adjoining Doppler channels by its absolute maximum.

After targets with different speeds have been roughly located at different bearings, a more accurate determination of distance and speed is possible by reducing the value $\alpha$ of the next transmitted pulse, which is subsequently selectively sent in the direction of the reflected target, and the pulse length of which is optimally adapted as a function of the distance from the target. It is particularly advantageous that this result is achieved with the same number of Doppler channels which were supplied with respective reference signals for correlation with the received signal. Even a reduction of the pulse length does not result in worsening of the frequency resolution and thus of the Doppler sensitivity if the value of $\alpha$ is reduced correspondingly. For different values of $\alpha$ it is only necessary to make corresponding reference signals available in order to achieve an improvement in locating the target with the same amount of calculation effort in the Doppler channels.

In an advantageous further embodiment of the method, assured detection of fixed targets as well as of targets moving at different speeds is possible by means of a single transmitted pulse. The transmitted signal consists of a plurality of lined-up pulse lengths, the transmission frequencies of which have different courses over time. For example, in the first pulse length the transmitting frequency can be selected to rise linearly. A very accurate determination of the distance, which is determined by the bandwidth of the transmitted pulse, is possible by means of this portion of the transmitted signal. In the subsequent pulse lengths the transmitted frequency can follow irrational functions with different values for the exponent α. Corresponding reference signals with Doppler shifts are calculated and stored for evaluation in the individual Doppler channels. Upon reception, the received signal for each directional characteristic is compared with the stored reference signals. The distance is determined from the first portion of the received signal, and targets of very different speeds are detected by means of the subsequent portion and their speed is determined with only the smallest error. The particular advantage of such a transmitted signal consists in that a distance measurement can be made with a small error and, always with the same number of Doppler channels, while rough and fine speed measurements are possible with only a single transmitted pulse, without the outlay for signal evaluation being increased. It is only necessary to calculate and store corresponding samples of reference signals beforehand. It is particularly advantageous that the respective pulse length and the value of the exponent α can be varied during operation, depending on the objective of detection, location and classification.

A transmitted pulse of several pulse lengths with linear frequency-modulated pulse sections of different middle frequencies aligned in accordance with a random code is described in U.S. Pat. No. 4,998,224. The advantages achieved there, for example the reduction in the disclosure of the transmitter's own position and interference from outside installations as well as the improvement in the reception of friendly installations, can be achieved with a further embodiment of the invention, if the transmitted pulse is disassembled and previously adjoining pulse sections are put together scrambled.

In another embodiment of the method of the invention, it is particularly advantageous to select a very small value of α if it is intended to discriminate between fixed targets and moving targets among the targets, because small deviations in speed in adjoining Doppler channels already cause a clear reduction of the course of the levels of the maxima of the ambiguity functions from the absolute maximum in the Doppler zero channel. However, if in underwater sound technology a differentiation between fast and slow watercraft and a determination of their speed is required within a large speed range, for example ±30 knots, a considerably larger value of α should be selected, for example α=½, in order to detect the movable targets there and to determine their target data.

If the object is to detect far distant moving targets, in a further embodiment of the method of the invention it is particularly advantageous in connection with large pulse lengths to select the value of α larger than α=½. This is because the Doppler sensitivity becomes greater due to the increasing pulse length and therefore the same resolution is attained by the adaptation to the pulse lengths. Here, too, calculation and storage of reference signals for different pulse lengths and different values of α are again necessary to be able to evaluate the received signals with the same Doppler channels. The particular advantage lies in that the adaptation is attained solely by the shaping of the transmitted signal and the reference signals.

In a further advantageous embodiment of the method of the invention, the number of the reference signals is limited by the number of Doppler channels made available. A particular advantage lies in that the shape of the transmitted signal as a function of the value of e fixes the exactness of the distance and speed determinations. All Doppler channels made available are used in the course of each measurement. These Doppler channels perform the correlation of the received signals with the reference signals, for example over the time range. It is possible in the same advantageous manner to perform the correlation in the frequency range. In this case the received signals and the reference signals must be subjected to a Fourier transformation in order to transform them from the time domain into the frequency domain, and to transform the result of the correlation back out of the frequency domain into the time domain. This is particularly advantageous if the entire signal processing of the transmitting/receiving installation takes place digitally in the frequency domain, the same as, for example, formation of the directional characteristics in the direction former.

The received signal of a given directional characteristic is compared with one of the reference signals in each Doppler channel. If the received signal and the reference signal show the same Doppler shift, the output signal of this Doppler channel provides the absolute maximum. If the frequency course differs between the received signal and the reference signal, this Doppler channel provides a reduced maximum of its ambiguity function. The maxima are reduced as the frequency difference between the reference signal and the received signal increases. The output signal of the Doppler channel that provides the absolute maximum of the ambiguity functions is the Doppler channel which provides the speed of the targets which can be calculated from the Doppler shift of the reference signal. The output signals of the Doppler channels are stored and compared with one another to determine the absolute maximum.

In yet a further embodiment of the method of the invention, it is particularly advantageous to display the level course of the maxima of the ambiguity functions at the outputs of the Doppler channels in color along a speed axis, wherein a color is assigned to each level value. Low level values are indicated by dark colors, high level values by light colors, for example from lilac, blue, green, yellow toward white, and the absolute maximum is provided with a red color marking. In a predeterminable time grid, which is selected as a function of a distance resolution taking into consideration the bandwidth, the colored level courses of the maxima of the ambiguity functions are displayed in sequence along a distance axis extending perpendicularly to the speed axis, wherein one distance interval corresponds to each time interval. The axes of these display levels are graduated by means of distance and speed values. In this way, contour lines of the ambiguity functions are generated by means of the colorization of the display, and targets can be particularly easily detected and their distance and speed determined by their color structure. A good overview of target structures, which are caused by a plurality of reflection centers, is obtained, as well as the possibility of detecting multipath propagation of the transmitted signal to the place of reflection and back again.

It is particularly advantageous to preset a frequency and time range for the display plane. The frequency range is suited to the speed range of interest of possible targets and is determined by the possible Doppler frequencies. The time range is preset as a function of the distance range to be examined.

Each direction-finding installation has a display of the position of the located targets. In the course of target locating, portions of the transmitted pulse reflected by the target are received selected directions. A direction or bearing must be assigned to each received signal. The time between transmission and reception indicates the distance to the target and the frequency shift of the received signal in comparison to the transmitted pulse is a measure of the speed.

All targets acquired by the direction-finding installation are displayed with their bearing and distance in the position display, for example a plan position indicator (PPI) display. In a further embodiment of the method of the invention, it is particularly advantageous if the frequency and time range is taken from the position display of the direction-finding installation. A defined target area is encircled by means of a cursor and is then displayed in color in the previously described display plane for a closer examination of the target regarding its speed and distance. The advantage of selecting a target area from the position display lies, in particular, in that the classification of a target of particular interest can take place rapidly and accurately in order to start possible tactical steps without delay. Since furthermore an overview of the entire situation is provided on the position display, it is possible to react rapidly to changes in position. A simultaneous more exact clarification of the selected target with the aid of the color tracing does not result in a loss of information regarding the total situation.

In an advantageous further embodiment of the method of the invention, the color-marked maximum of the ambiguity function in the display plane is picked up for closer target examination and a section through the display plane perpendicularly to the time axis is made, for example with a cursor. The maxima of the ambiguity function of all Doppler channels at this time are displayed laterally of the display plane via the speed axis. This level course has a distinctive absolute maximum at the place which marks the speed of the target on the speed graduation. The error of the speed measurement can be read off directly from the width of the maximum. With the same usefulness/interference ratio, the steeper the rise of the absolute maximum, the smaller the error in the speed measurement. A section parallel to the time axis in a further embodiment of the invention discloses the course of the maxima of the ambiguity function over time. Here, too, an absolute maximum can be discerned from the distance value which is associated with the speed value of the target and an evaluation of the distance measurement is possible. The level course over the speed is available at one and the same time at the outputs of the Doppler channels. The level course over time of the ambiguity function at the output of a Doppler channel is obtained in that all courses of the ambiguity functions over time are stored within the pre-selectable period of time and are subsequently called up for display from the memory. The particular advantage of this display consists in that an evaluation of the measured results regarding speed and distance can be directly read off.

With another advantageous embodiment of the method of the invention in accordance, the frequency/time range shown in color is examined for the presence of targets if the color structure gives rise to doubts whether there is a target at all. For this purpose the respectively largest output signal of each Doppler channel is displayed independently of distance or independently of time in the form of a level tracing over the speed axis. A second level tracing over the distance axis shows, independently of the Doppler channel, the respectively largest output signal in every time increment. Two level tracings are generated, which only show a distinct absolute maximum if there is at least one target in the time/frequency range being examined, if not, the level tracings have a smooth course.

The correlation between the received signal and the reference signal performed in each Doppler channel shows a Doppler-dependent distance error. In an advantageous further embodiment of the method of the invention, this distance error is corrected in that the output signals of the Doppler channels are displayed with a time offset, wherein the time offset is individually considered for each Doppler channel as a function of the Doppler shift. The Doppler shift causes a frequency offset between the frequency course of the reference signal and the received signal so that, displaced by the time offset, the same frequencies appear in the frequency courses within a period of time which is equal to the pulse length minus the time offset. This time offset approximately corresponds to the distance error of the ambiguity function. The advantage of displaying these corrected output signals lies in that the target structures stand out better in the color tracing, since the back of the ambiguity function is turned away from the time axis toward the frequency axis, because the approximately determined distance error, in accordance with this further embodiment, has been taken into consideration, so that the display of the output signals of the Doppler channels in the frequency-time range has been displaced, corrected for distance, towards the target distance.

In a further embodiment of the method of the invention, Doppler-shifted reference signals are calculated for all values of α, correlated with the transmitted signal and the maxima of these cross-correlation functions are stored as a function of the associated speed value or combined in a table. The advantage here is that with the output signals of only a few Doppler channels as the scanning values, the level course of the maxima of the ambiguity functions can be represented and that by means of a comparison with the Doppler shifted reference signals there is the possibility of determining the speed of a target. This method can be advantageously used for a quick overview.

In another aspect of the invention, advantageous devices are provided for executing the method of the invention, wherein either transmitted signals in the form of electromagnetic waves or acoustical waves are transmitted and their reflected portions are received.

Only a small number of Doppler channels in the receiving installation is required in an advantageous further embodiment of the device of the invention. Doppler frequency-shifted reference signals are correlated with the transmitted signal in a level computer and the course of the maxima of the correlation functions is stored. The received signal picked up via the directional characteristic is evaluated in a total of three Doppler channels, for example. The correlation result is compared with the course of the stored maxima in the level computer. When they agree, the speed of the target has been determined. A particular advantage of this device lies in the small outlay for Doppler channels per receiving direction.

It is furthermore advantageous that the calculation of the course of the maxima of the correlation function can take place independently of the transmitting-receiving installation in an external computer. The courses are calculated and stored for pre-determined values of α, pulse lengths T and bandwidth B as parameters.

It is particularly advantageous if, in the case of a sonar installation, the transmitted signals are beamed by a transmitter unit installed on a towed body, because this towed body can be towed, depending on the propagation conditions in the water, at an appropriate depth so that it is possible to locate even those submarines which are in defined layers of the water and would otherwise be undetectable because of sound reflections at the layer interfaces. In order to be able to operate with low transmission frequencies, by means of which it is possible to detect and locate even far distant targets, it is particularly advantageous to use a trailing antenna as a receiving installation which is towed by the watercraft. These towed antennas are distinguished by the good directivity of their directional characteristics even for low frequencies.

The method and device of the invention for identifying moving targets and/or determining their target data in respect to speed and/or distance are described in detail below in conjunction with the accompanying drawings which include a block diagram of an exemplary embodiment of a transmitting/receiving installation for broadcasting transmitted signals in accordance with the invention.

DETAILED DESCRIPTION OF THE PREFERRED EMBODIMENT

Figure 1:
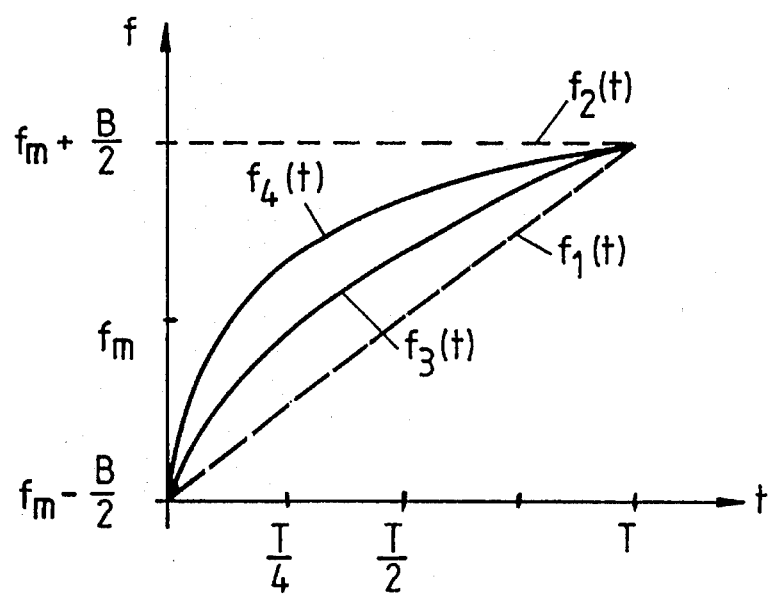
FIG. 1 is a diagram showing the courses of different transmitting frequency functions over time for explaining the principles of the invention.

Referring to FIG. 1, transmitted signals within a pulse length T and having a frequency course of an instantaneous transmitting frequency $f_i$ are transmitted by a sonar installation in accordance with an irrational function, and portions thereof reflected by a target are received. The transmitting frequency $$f_i = f_m - \frac{B}{2} + B\left(\frac{t}{T}\right)^\alpha$$

rises from a lower frequency $f_m - B/2$ at a time $t = 0$ up to an upper frequency $f_m + B/2$ at the time $t = T$, wherein $f_m$ is a center frequency, B indicates the maximum bandwidth of the sonar installation to be processed and $\alpha$ is the exponent of the irrational function of the transmitting frequency $f_i$ and can assume all values in a range $0 < \alpha < 1$. The course of the transmitting frequency $f_i$ for all values $\alpha = \frac{1}{2}$, $\alpha = \frac{1}{4}$ has been entered in a diagram in FIG. 1. The limits of the course of the transmitting frequency are given by the straight lines $f_1(t)$, the frequency course of which corresponds to a linear frequency-modulated (LFM) pulse, and $f_2(t)$, the frequency course of which is constant and corresponds to a CW pulse. The frequency course $f_3^{(t)}$ SHOWS a change of the transmitting frequency $f_i$ within the pulse length T in accordance with a root function. The exponent of the irrational function $f_3(t)$ has the value $\alpha = \frac{1}{2}$. If the value is reduced to $\alpha = \frac{1}{4}$, the transmitting frequency $f_i$ follows the frequency course $f_4(t)$. The increase of the irrational function $f_i t$ increases with a decreasing value of $\alpha$ in the beginning area of the transmitted pulse and decreases with time t.

Figure 2:
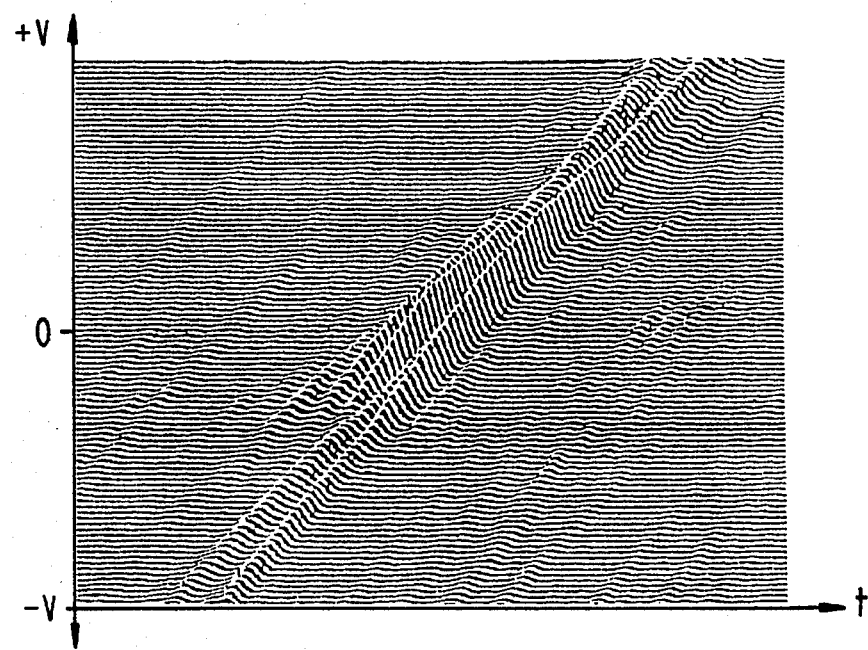
FIG. 2 shows the ambiguity function of an LFM pulse in accordance with the prior art.
Figure 3:
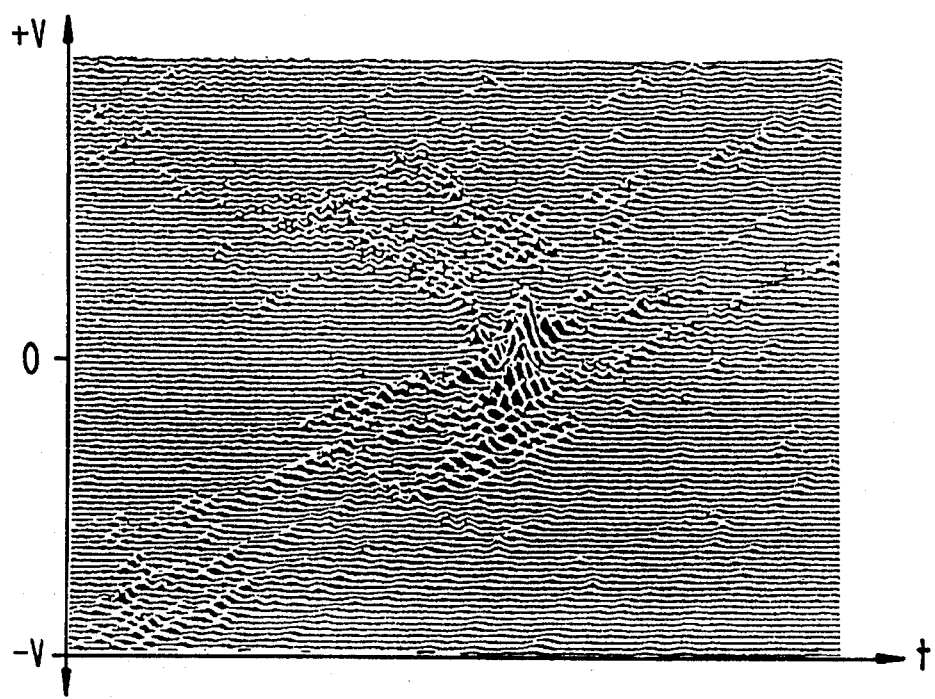
FIG. 3 shows the ambiguity function of a transmitted pulse in accordance with the invention.

FIG. 2 shows the ambiguity function for a linear frequency-modulated pulse in accordance with the prior art. FIG. 3 shows the ambiguity function for a transmitted pulse formed in accordance with the invention, the frequency course $f_3(t)$ of which follows the root function. The back of the knife shape of the ambiguity function of the LFM pulse in a display plane defined by the distance axis R and the speed axis v can be clearly seen. A comparison with FIG. 3 clearly shows that in contrast to the known ambiguity function of the LFM pulse of FIG. 2, the signal energy of a pulse shape of the invention in accordance with FIG. 3 is concentrated and that the ambiguity function has a considerably more pronounced maximum corresponding to a mountain peak. A distance and speed measurement with a frequency course $f_3(t)$ within the transmitted pulse is possible with greater accuracy than with an LFM pulse of equal bandwidth and pulse length.

Figure 4:
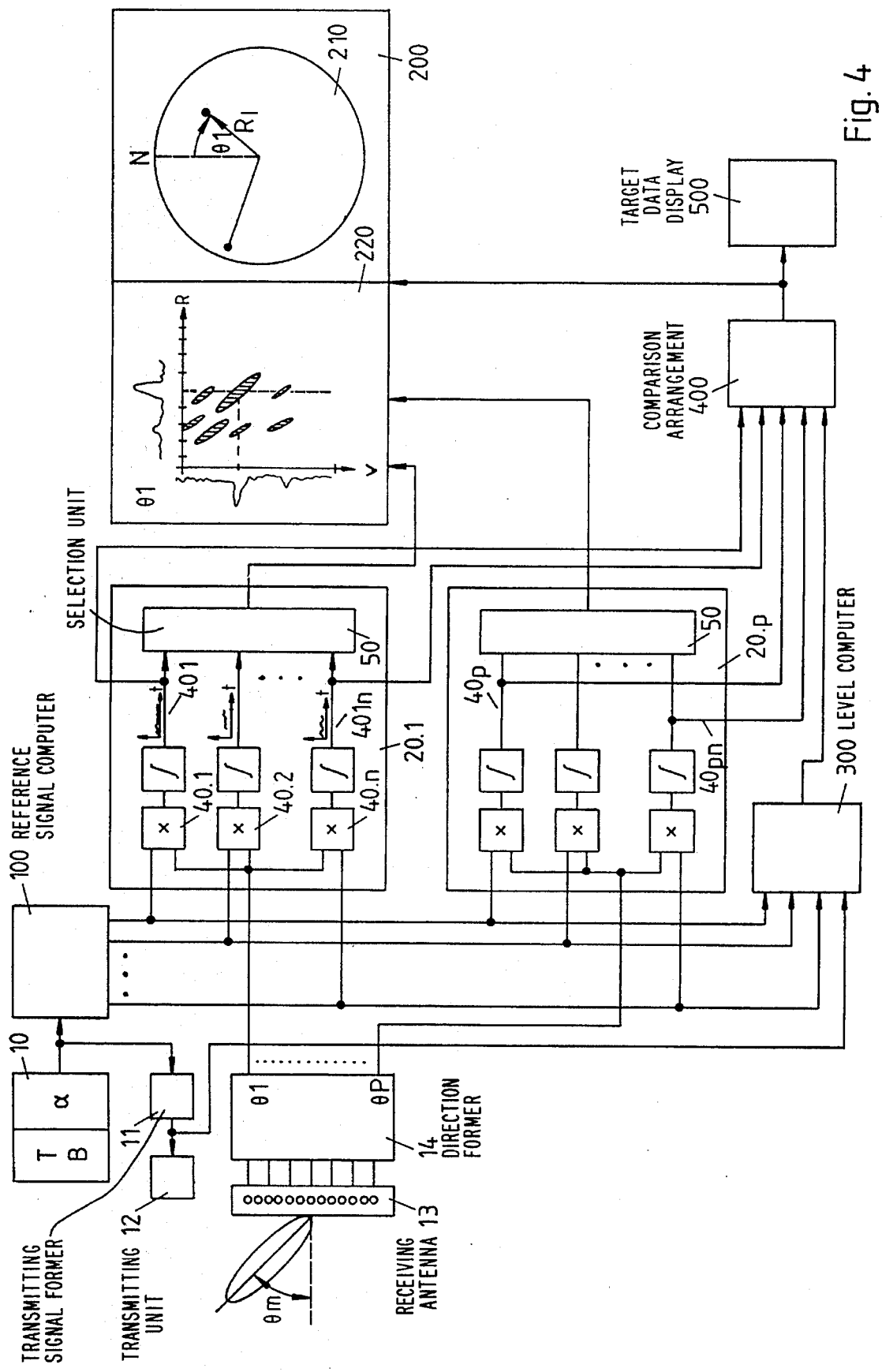
FIG. 4 is a block diagram of an embodiment of a sonar installation employing the principles of the invention.

FIG. 4 shows a block diagram of an embodiment of a sonar installation for transmitting a frequency-modulated pulse in accordance with the invention, the frequency course $f_i(t)$ of which can be set by means of the value of the exponent $\alpha$, for example in accordance with the irrational function shown in the diagram of FIG. 1. A value of $\alpha$ as a function of the desired distance and speed resolution is entered by an operator at an input 10, together with a pulse length T and bandwidth B. Input 10 triggers a transmitting signal former 11 which calculates the transmitted pulse. The transmitted pulse is broadcast by a transmitting unit 12 via a transmitting antenna either omnidirectionally or with direction selectivity. Transmitting unit 12 is towed by a vessel (not shown) carrying the sonar installation at a pre-selectable depth. Reflected portions of the transmitted pulse are received by means of a receiving antenna 13, which is also towed by the vessel as a "towed array", and provided to a direction former 14. The directional characteristics in pre-selectable directions are formed by means of direction former 14, and the received signals of the directional characteristics pointing to angles $\theta_1$ to $\theta_p$ are evaluated. Identical evaluation units 20.1 to 20.p are provided for each directional characteristic. Each evaluation unit 20.1 . . . 20.p contains n Doppler channels with correlators 40.1 . . . 40.n for evaluating the received signals in respect to speed and distance by forming the ambiguity function. The output signals of correlators 40 are the output signals of the Doppler channels and are provided to a selection unit 50.

Reference signals are generated in a reference signal computer 100, which is connected with input 10, for the value of the exponent $\alpha$ of the irrational function $f_i(t)$. The reference signal has the same pulse length T as the transmitted signal. For a stationary target the frequency course $f_i(t)$ of the reference signal is identical with that of the transmitted signal. Moving targets cause a frequency shift in the received signal corresponding to the Doppler effect, which is evaluated for determining the speed of the target in the direction toward the point of reception. For this purpose reference signals are provided with such frequency shifts which are possible in accordance with the Doppler effect. Since it is known what the maximum speed of the wanted target can be, this provides the greatest frequency shift which can be positive or negative, depending on whether the target approaches the point of reception or moves away from the point of reception. The number of the reference signals and Doppler channels is a function of the speed resolution. n reference signals with frequency shifts D1 to Dn are calculated in the reference signal computer 100 and connected with correlators 40.1 to 40.n of the Doppler channels.

The evaluation of the received signals of each directional characteristic is performed by means of the reference signals in the Doppler channels during pre-selectable time periods which are a function of the range, in that the course over time of the received signal is correlated with the course over time of the reference signal. The correlation result is the maximum of the ambiguity function and the output signal of the Doppler channel. The absolute maximum of all output signals indicates the Doppler channel which receives the reference signal having the least deviation in respect to time and frequency shifts in relation to the received transmission signal. The frequency of the reference signal and its time shift indicate the target data (speed and distance) of the target.

Output signals of the Doppler channels are provided to a display 200 via selection units 50 in evaluation units 20. The received signals of the directional characteristics as a function of the bearing and distance are shown in polar coordinates on a position display 210 in display 200. A display in Cartesian coordinates is also possible. For this purpose the selection unit 50 of each evaluation unit 20 connects the respectively greatest output signal of its Doppler channels with the display 210 in pre-selectable units of time. The units of time are selected as a function of the bandwidth and distance resolution. Because the directional characteristics are formed parallel in time in the direction former 14, a bearing direction 8 is assigned to each evaluation unit 20. Target areas of particular interest can be selected by means of a cursor from position display 210 and displayed in a second display field 220 in a representational plane for distance and speed range. In a vertical direction, the output signals of the Doppler channels per unit of time of a single evaluation unit 20.1 are shown as a color tracing. A color is assigned to each level value of the output signal, for example for ascending level values the colors violet, blue, green and yellow. In this way a flat color tracing is created in which the maxima per unit of time of the ambiguity functions of all Doppler channels in themselves are displayed next to each other. Contour lines of the same color are formed in the display plane, of which the absolute maximum stands out markedly and is provided with a red dot.

Figure 5:
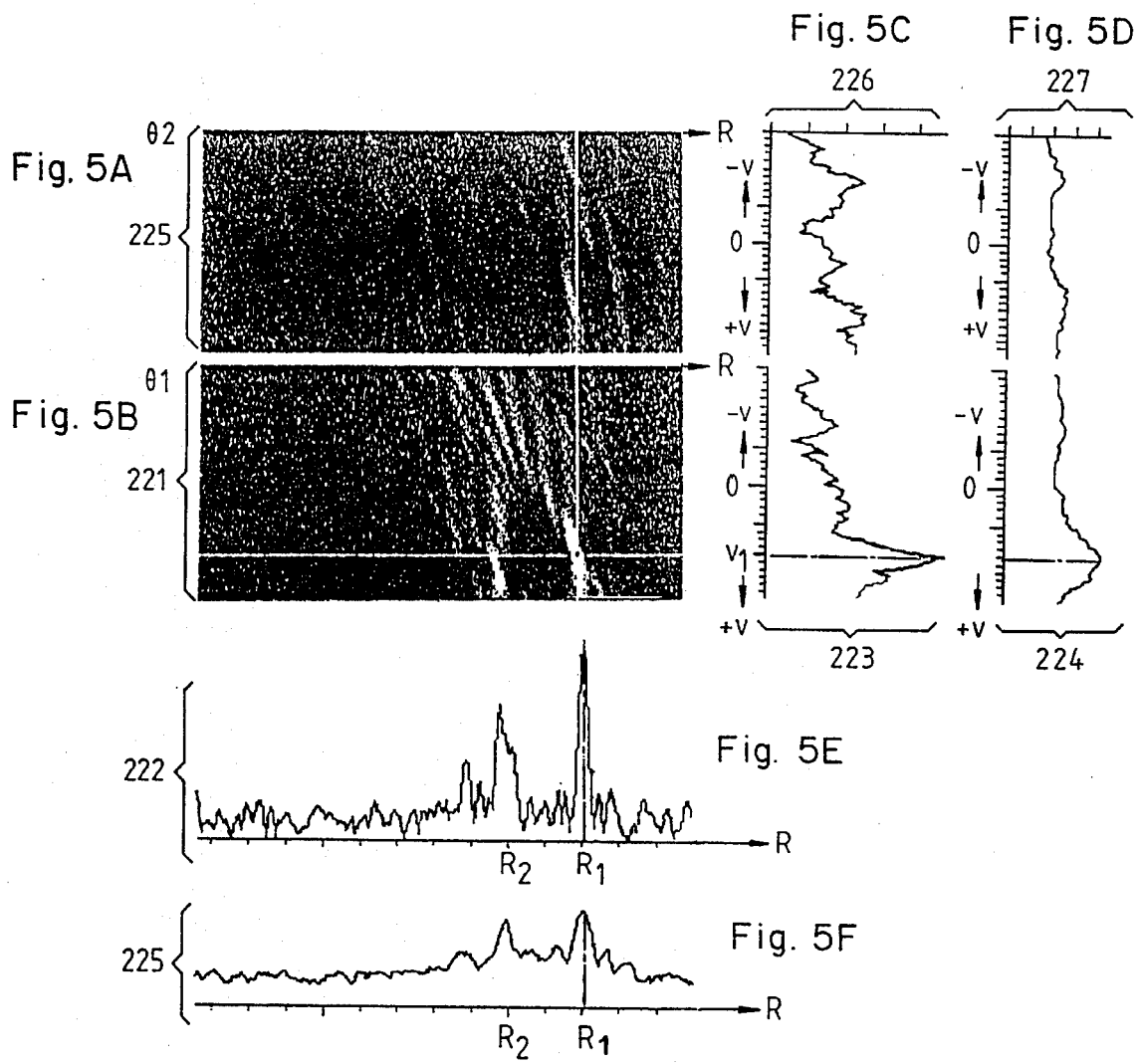
FIG. 5 is a portion of a display in the block diagram of FIG. 4.

Such a color tracing for a speed range 221 is shown in black and white in FIG. 5 for the direction θ1. A typical target structure can be seen, which is created by multipath propagation and different reflection centers. For a closer examination of the target it is determined in which Doppler channel the absolute maximum is present, either by the viewer by means of a cursor or by selection unit 50 in evaluation unit 20.1. The course over time of the evaluation signals of this Doppler channel are displayed parallel to the horizontal distance axis R in the form of a level tracing 222 under the area 221. Maxima can be seen at the distances R1 and R2, the absolute maximum being at R1.

The level course 223 of the individual Doppler channels associated with this point in time is displayed to the right of the area 221 over the speed axis ±v. The absolute maximum is located at the speed v1. Therefore the target has the target data θ1, R1 and v1. The accuracy of the measuring results in respect to the distance $R_1$ and speed $v_1$ can be seen from the width of the absolute maximum of the level courses 222 or 223.

The level tracing 224 also provides information regarding the target data and their quality, wherein the absolute maxima of the Doppler channels in the entire area 221 are shown over the speed axis ±v independently of the distance R. It can be seen here, too, that the absolute maximum is located at the speed v1. The level tracing 225 shows the absolute maxima of the Doppler channels as a function of the distance R, regardless in which of the Doppler channels 40.1 to 40.n this maximum occurs. Distinct maxima can be seen at the distances R1 and R2, so that the question arises here whether there is a second target at the distance R2. In this case the vertical cursor in the area 221 would be pushed to the left and the course of the output signals of the Doppler channels for this point in time would be displayed as a level tracing.

A black and white copy of such a color tracing is shown in the upper area 225 in FIG. 5 for the adjoining direction θ2 for an identical distance and speed range as in the lower area 221. Here again traces can be seen which suggest a target structure which for example could be associated with the target at the bearing θ1. For closer examination a level tracing 226 is made corresponding to the vertically set cursor, wherein the output signals of the Doppler channels at this point in time are displayed over the speed axis ±v. No absolute maximum can be derived from the level tracing 226, so that it can be assumed that there is no second target and that the structure in the area 225 is associated with the target detected in the direction θ1. The level tracing 226, wherein the largest maxima in the Doppler channels in the time period considered are shown for the direction θ2 regardless of distance, also shows no distinct maximum, so that further examination of the ambiguity functions for the direction θ2 can be omitted.

If a closer examination of the target at the bearing θ1 at the distance R1 is desired, it is possible to vary the frequency course of the next transmitted pulse as a function of the width of the maxima in the level tracings 222 and 223 by making changes by means of input 10. If a more accurate speed resolution is desired, the value of the exponent e is reduced, if a better distance resolution is desired, the value of the exponent α is increased. In the same way, it is possible to enter different values of α for a plurality of sequential pulse lengths, wherein one of the pulse lengths can also contain a frequency-constant or linear frequency-modulated wave train.

Figure 6:
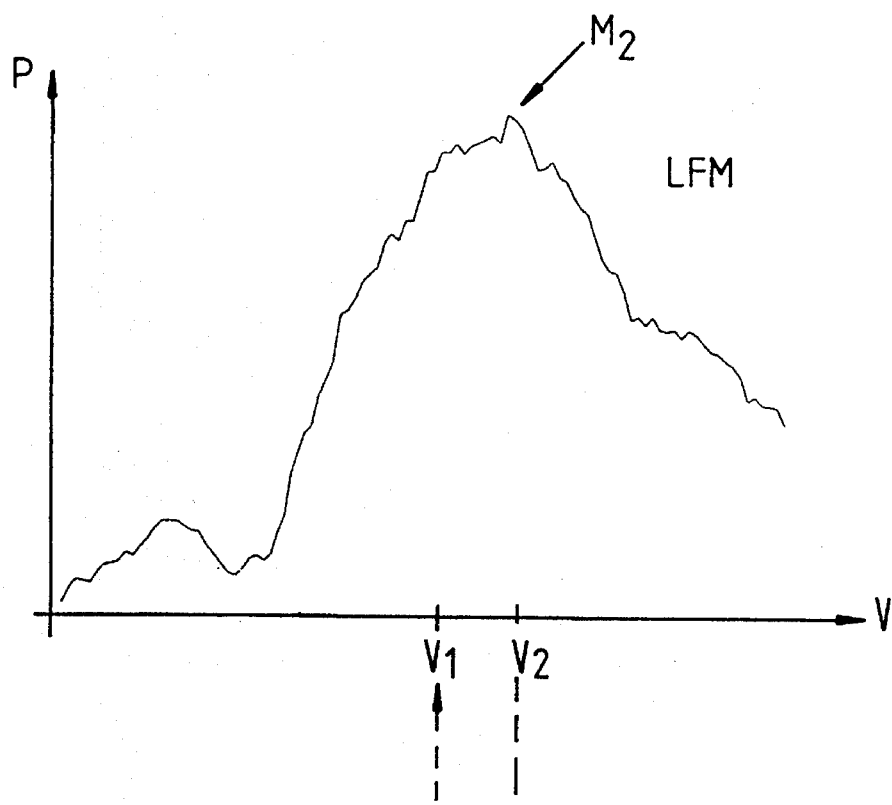
FIG. 6 is a sectional view of the ambiguity function of FIG. 2.
Figure 7:
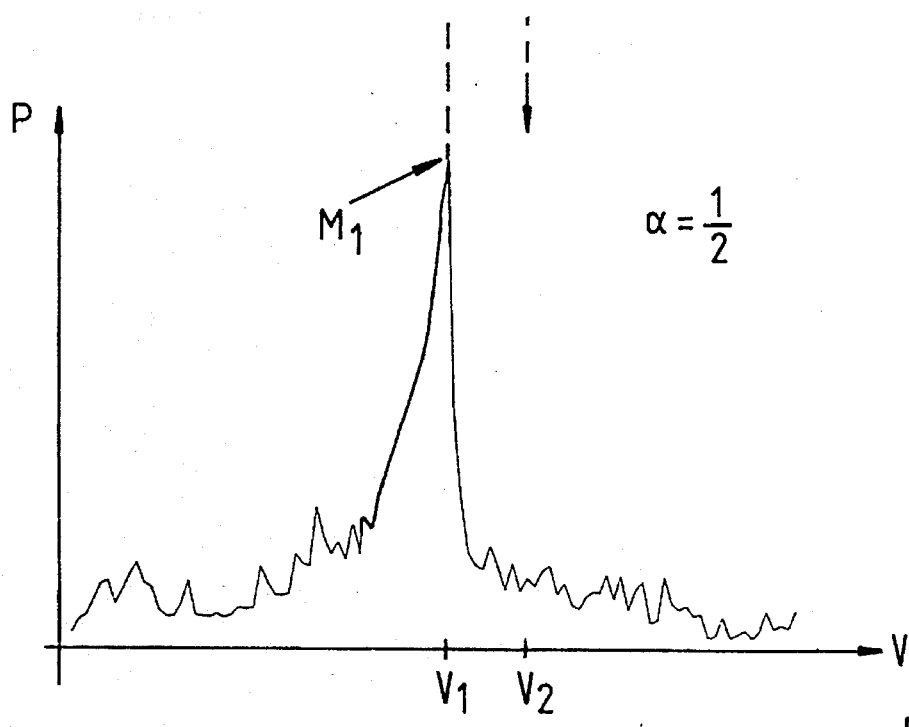
FIG. 7 is a sectional view of the ambiguity function of FIG. 3.

FIG. 6 shows the course of the maxima of the ambiguity function over the speed axis v for an LFM pulse; FIG. 7 shows, with the same target situation, the course of the maxima of the ambiguity function over the speed for a transmitted pulse the frequency of which increases with the root function, i.e. the exponent having the value α=½. It can be clearly seen that the absolute maximum M1 in FIG. 7 is considerably more distinct and steeper than the absolute maximum M2 in FIG. 6. It can also be seen that the absolute maxima M1 and M2 appear in different Doppler channels which correspond to the speeds v1 and v2. This state of affairs can be explained in that with the LFM pulse the ambiguity functions in adjoining Doppler channels have almost the same level with the same time shifts and that it is hard to determine which Doppler channel shows the true speed of the target. In contrast thereto the absolute maximum can be unequivocally seen in FIG. 7. With the transmitted pulse modulated in accordance with the invention, adjoining Doppler channels have considerably lower levels of the maxima of the ambiguity function, so that it can be seen without a doubt which Doppler channel shows the speed with the smallest error and is used for determining the distance.

Figure 8:
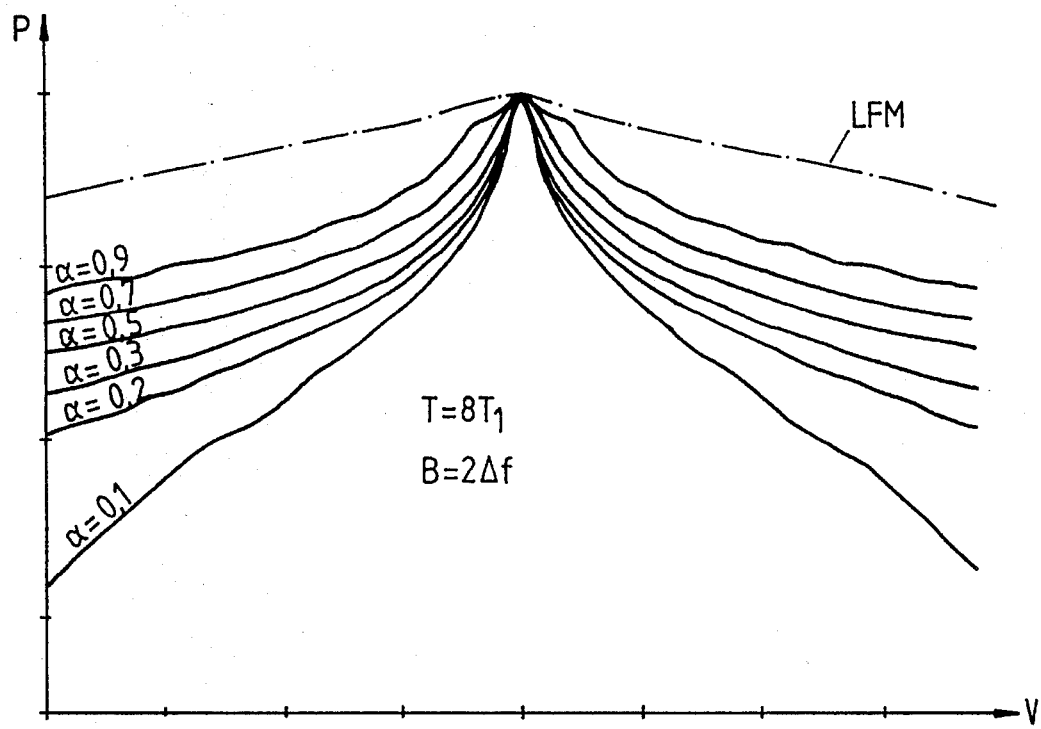
FIG. 8 shows the level course of the output signals of Doppler channels as a function of the value of the exponent $\alpha$.

FIG. 8 shows the level course of the maxima of the ambiguity function at the output of the Doppler channels for transmitted pulses, the transmission frequencies of which follow irrational functions, with the exponent values $\alpha = 0.1$; $\alpha = 0.2$; $\alpha = 0.3$; $\alpha = 0.5$; $\alpha = 0.7$ $\alpha = 0.9$ and for a linear frequency-modulated transmitted pulse LFM with the same bandwidth $B=2\Delta f$ and pulse length $T=8T_1$. In each case the absolute maximum can be clearly seen because the maxima in the adjoining Doppler channels are considerably less, while a considerably lesser reduction of the maxima can be seen for the LFM pulse. Doppler sensitivity increases with smaller values of $\alpha$, i.e. the absolute maximum which characterizes the Doppler channel for the speed determination is raised more steeply.

Figure 9:
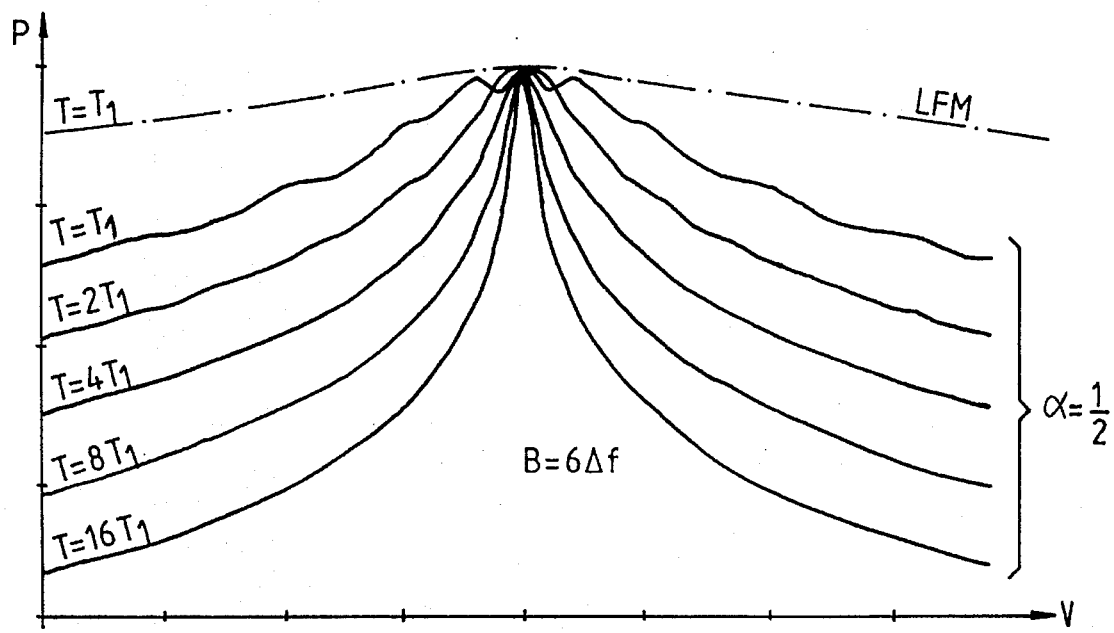
FIG. 9 shows the level course of the output signals of Doppler channels as a function of pulse length.

FIG. 9 shows the level course of the maxima of the ambiguity function with a great increase of the Doppler sensitivity for transmitted pulses with the same frequency course $f_3(t)$ of the transmitting frequency $f_i$ with the value $\alpha=\frac{1}{2}$, but different pulse lengths $T=T_1$, $T=2T_1$, $T=4T_1$, $T=8T_1$ and $T=16T_1$. For comparison, the level course for the LFM pulse of pulse length $T_1$ is shown in dash-dotted lines. The increased Doppler sensitivity in comparison with the LFM pulse can be clearly seen at short pulse lengths and increases with greater pulse lengths, so that it is assuredly possible to detect and classify targets in the near range as well as at long range. Another advantage consists in that an unambiguous speed determination is possible with short pulses and that their error then becomes less, the smaller the value of the exponent $\alpha$ for the next transmitted pulse is selected.

Figure 10:
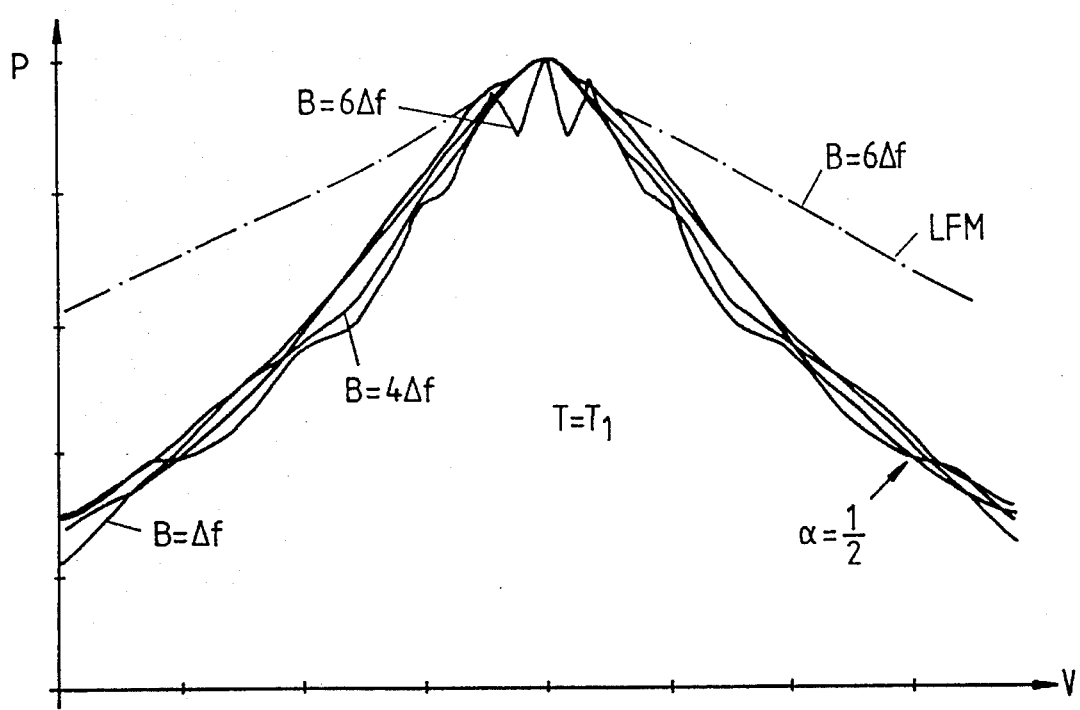
FIG. 10 shows the level course of the output signals of Doppler channels as a function of bandwidth.

FIG. 10 shows in the level courses the effects of the selected bandwidth $B=\Delta f$, $B=4.\Delta f$, $B=6.\Delta f$ on the Doppler sensitivity for transmitted pulses with the value $\alpha=\frac{1}{2}$ and for a transmitted LFM pulse shown in dash-dotted line for comparison. It can be seen that the bandwidth B has no essential effect, so that the bandwidth B as a function of the reverberation can be freely selected independently of the distance resolution.

Level courses in accordance with FIGS. 8, 9 and 10 are calculated in a level computer 300 of the sonar installation in accordance with the block diagram of FIG. 4, or in an external computer, by correlation of the Doppler-shifted reference signals with the transmitted signal and are stored with speed values corresponding to the Doppler frequency shifts. The input side of the level computer 300 is connected with reference signal computer 100 and transmitting signal former 11, and the output side with a comparison arrangement 400. The output 401, . . . 40p of the Doppler channel in the evaluation units 20.1, . . . n 20.p, which has as its reference signal the Doppler zero signal, i.e. the transmitted signal, and at least three further outputs selected from outputs 401n, . . . , 40pn, are also connected together with the comparison arrangement 400, in which the level course is obtained from the output signals of these Doppler channels by interpolation and is compared with the level courses in the level computer 300. When they agree, the speed of the target is fixed. The result is displayed numerically in a target data display 500, or as a color value on the PPI representation 210 on the target point displayed under the associated bearing and distance.

The invention has been described in detail with respect to preferred embodiments, and it will now be apparent from the foregoing to those skilled in the art that changes and modifications may be made without departing from the invention in its boarder aspects, and the invention, therefore, as defined in the appended claims is intended to cover all such changes and modifications as fall within the true spirit of the invention.

What is claimed is:

1. A method for determining target speed and distance, comprising:

transmitting and receiving a signal with continuous frequency-modulated waves within a pre-determinable pulse length T, wherein a transmitted frequency f of the signal is selected to be rising or falling over a time t during the pulse length T within a pre-selectable bandwidth B in accordance with a pre-selectable irrational function having the form $$f = f_m - \frac{B}{2} + B \left( \frac{t}{T} \right)^a$$

wherein $f_m$ is a center frequency, $\alpha$ is an exponent that has a constant value during the pulse length T and is selected to be larger than 0 and smaller than 1, so that the transmitted frequency rises from a lower frequency $f_m - B/2$ at time $t=0$ and to a higher frequency $f_m + B/2$ at time $t=T$; and forming an ambiguity function from the received signal and evaluating the ambiguity function for determining speed and distance.

2. A method in accordance with claim 1, wherein the transmitted signal consists of a plurality of lined-up pulse lengths, and said method further comprises selecting the transmitted frequency (f) during at least one of the pulse lengths (T) within the bandwidth. (B) to be one of constant linearly rising and linearly falling.

3. A method in accordance with claim 1, wherein selected speed ranges are preset, and said method comprises selecting the value of the exponent $\alpha$ to be more divergent from 1 as the speed range becomes smaller.

4. A method in accordance with claim 1, wherein distance ranges are pre-selected and said method comprises selecting the value of the exponent $\alpha$ to be greater as a function of the pulse length increasing with distance range increases.

5. A method in accordance with claim 1, wherein said forming and evaluating step includes:

using a number of Doppler channels each with a correlator for evaluating the received signal independently of the selected value for the exponent $\alpha$;

calculating and storing, for each selectable value of the exponent $\alpha$, a like number of reference signals which are Doppler frequency-shifted in respect to the transmitted signal;

supplying each reference signal to a respective one of the correlators;

calculating the ambiguity function and producing as an output signal in each Doppler channel the maximum value of the ambiguity function as a function of time; and storing and/or displaying the output signal of each channel.

6. A method in accordance with claim 5, wherein said storing and/or displaying step includes displaying, for at least one selectable received signal, a level course of the maxima of the ambiguity functions at the outputs of the Doppler channels in color as a function of time in a pre-selectable time range in a representational plane defined by speed and distance axes, wherein a color is assigned to each level value.

7. A method in accordance with claim 6, wherein each received signal is associated with a direction of incidence θ which corresponds to a bearing to a target, and a time between transmission and reception, which corresponds to a distance R to the target, and said displaying step includes: providing a position display that is triggered by the received signals for displaying targets in respect to their bearing and distance; and selecting a displayed target by means of a cursor in the position display.

8. A method in accordance with claim 6, said displaying step includes displaying the instantaneous level course of the maxima of all Doppler channels parallel to the speed axis of the representational plane upon the occurrence of the absolute maximum of the ambiguity functions in one of the Doppler channels.

9. A method in accordance with claim 6, wherein said displaying step includes displaying, parallel to the distance axis of the representational plane, the course over time of the ambiguity function at the output of the Doppler channel having the absolute maximum over time.

10. A method in accordance with claim 6, wherein said displaying step includes displaying within a preset frequency and time range the respectively largest output signal of each Doppler channel parallel to the speed axis in the form of a level tracing independently of the distance.

11. A method in accordance with claim 6, wherein said displaying step includes displaying within a preset frequency and time range the respectively greatest of all output signals of the Doppler channels parallel to the distance axis over time in the form of a level tracing independently of the Doppler channel.

12. A method in accordance with claim 6, further comprising the step of shifting the stored output signals by a time offset that is determined from the Doppler shift associated with the respective Doppler channel and is equal to the time offset at which the Doppler-shifted frequency appears in the frequency course of the transmitted signal; and wherein said displaying step includes reading out and displaying the shifted output signals over the entire time range for each Doppler channel.

13. A method in accordance with claim 5, further comprising the steps of calculating and storing as a function of speed values the level course of the maxima of the correlation functions of reference signals which are Doppler frequency-shifted in respect to the transmitted signal for all selectable values for the exponent α;

scanning values from instantaneous output signals of at least three Doppler channels to form an interpolated level course; and comparing the interpolated level course with the stored level courses for determining speed and distance to a target when there is agreement between the interpolated level course and one of the stored level courses.

14. A device determining target speed and distance, comprising:

a transmission/receiving installation for transmitting and receiving a signal with continuous frequency-modulated waves within pre-determinable pulse lengths, said installation comprising:

an device input for receiving respective input values for an exponent α, for at least one pulse length T and for a pre-selectable bandwidth B;

a transmitting signal former responsive to the input values in said input device for producing a frequency-modulated signal for transmission having a frequency f selected to be rising or falling over a time t during at least one pulse length T within the pre-selectable bandwidth B in accordance with a pre-selectable irrational function having the form $$f = f_m - \frac{B}{2} + B \left(\frac{t}{T}\right)^a$$

wherein $f_m$ is a center frequency, α is an exponent that has a constant value during the pulse length T and is selected to be larger than 0 and smaller than 1, so that the transmitted frequency rises from a lower frequency $f_m-B/2$ at time t=0 and to a higher frequency $f_m+B/2$ at time t=T;

a transmitting signal unit including a transmitting antenna connected to said transmitting signal former for transmitting the frequency-modulated signal produced by said transmitting signal former;

a reference signal computer connected to said input and being responsive to said input values for calculating Doppler frequency-shifted reference signals and producing said Doppler-shifted reference signals at an output of said reference signal computer;

a receiving antenna;

a direction former coupled to the receiving antenna for forming a directional characteristic for signals received from respectively different pre-selectable directions by said receiving antenna;

a plurality of Doppler channels corresponding to each directional characteristic, said Doppler channels each including a correlator, all Doppler channels of each plurality of Doppler channels being connected with said direction former for receiving a signal of a selected one of the directional characteristics and each Doppler channel of each said plurality of Doppler channels additionally being connected to the output of said reference signal computer for receiving a respective one of the Doppler-shifted reference signals, wherein each Doppler channel of each plurality of Doppler channels correlates over time during pre-selectable time periods a respective Doppler-shifted reference signal with a received signal corresponding to one of the directional characteristics, the correlation of each Doppler channel constituting the maximum of an ambiguity function and the output of the Doppler channel;

means for evaluating the outputs of the Doppler channels for determining speed and distance of a target; and a display coupled to said evaluating means for displaying speed and distance of the target.

15. A device in accordance with claim 14, further comprising: a level computer connected with said reference signal computer and said transmitting signal former for calculating the course of the maxima of the correlation functions of the transmitted signal and Doppler frequency-shifted reference signals and for storing the level courses as a function of speed values corresponding to the Doppler frequency shifts;

comparison means connected downstream of the level computer and being connected with at least three Doppler channels for the received signal to be evaluated; and a target data display connected downstream of the comparison means.

16. A device in accordance with claim 14 for an underwater sound locating installation on a watercraft, wherein said transmitting unit with said transmitting antenna is installed in a towed body which is towed by the watercraft, said transmitting antenna radiates the transmitted signal transmission omnidirectionally or in pre-selectable transmission directions in the form of sound waves, said receiving antenna is embodied as a trailing antenna which can be lowered by the watercraft and is towable, and said direction former is housed in the watercraft and is connected via cables with said receiving antenna.

* * * * *